Oct. 2, 1956  E. E. PARTIN  2,765,199
ANTI-SKID WHEEL ASSEMBLY
Filed Feb. 17, 1956  2 Sheets-Sheet 1

INVENTOR.
EARL E. PARTIN
BY McMorrow, Berman + Davidson
ATTORNEYS

Oct. 2, 1956 — E. E. PARTIN — 2,765,199
ANTI-SKID WHEEL ASSEMBLY
Filed Feb. 17, 1956 — 2 Sheets-Sheet 2
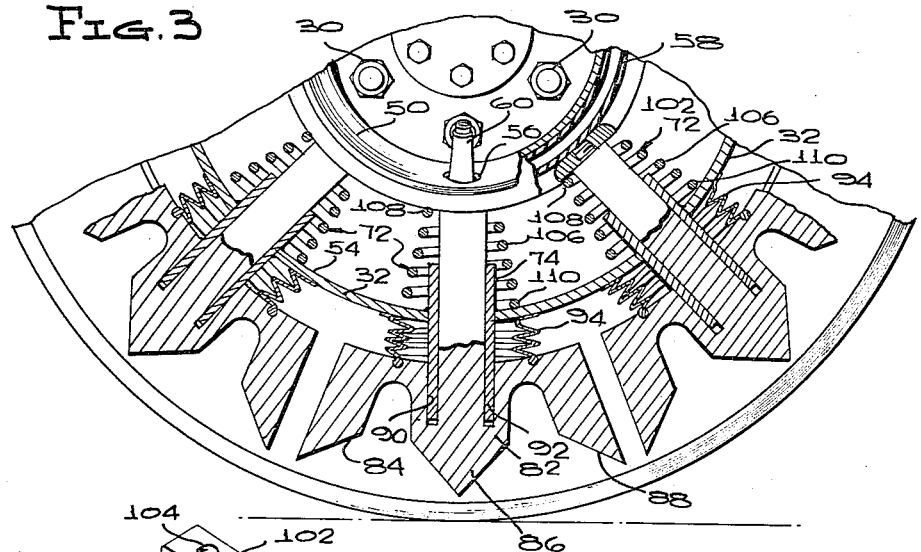
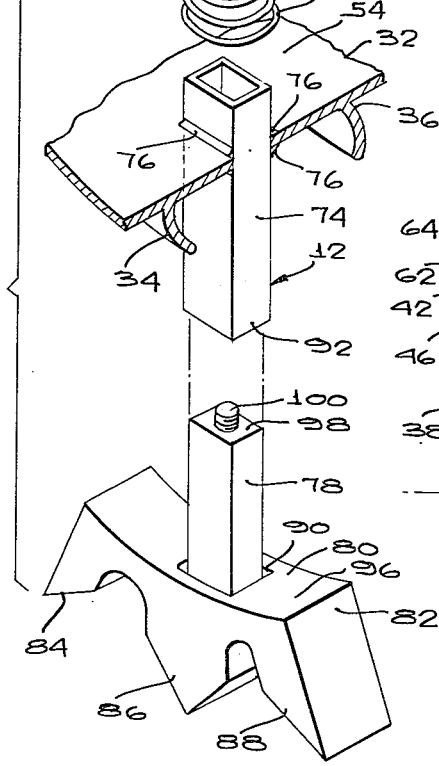
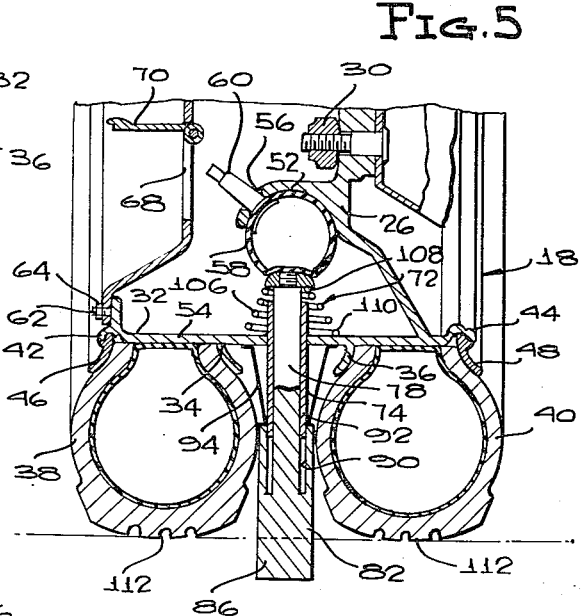
INVENTOR.
EARL E. PARTIN
BY McMorrow, Berman & Davidson
ATTORNEYS

United States Patent Office 2,765,199
Patented Oct. 2, 1956

2,765,199

ANTI-SKID WHEEL ASSEMBLY

Earl E. Partin, Willow Run, Mich.

Application February 17, 1956, Serial No. 566,218

4 Claims. (Cl. 301—47)

This invention relates generally to vehicle wheel assemblies and is more particularly concerned with a novel anti-skid wheel assembly wherein the vehicle upon which the novel assemblies are mounted is readily usable in snow, mud, etc.

A primary object of the invention is to provide a novel anti-skid wheel assembly including a wheel having a rim supporting thereon a tire assembly, a plurality of radially disposed anti-skid lug assemblies reciprocably supported on the wheel rim, the lug assemblies including a friction increasing means on a terminal end portion thereof which may be extended beyond the outer periphery of the tire assembly, and fluid pressure means supported on the wheel and engageable with the lug assemblies effective to overcome spring means associated with the lug assemblies which normally urge the lug assemblies to a retracted position below the outer periphery of the tire assemblies.

A further object of the invention in conformance with that set forth is to provide in a novel anti-skid wheel assembly of the character set forth a fluid pressure means comprising an annular inflatable or collapsible tube which is concentrically disposed within the inner periphery of the wheel rim of the novel wheel assembly, wherein the lug assemblies comprise a plurality of radially disposed support sleeves extending through the rim, said support sleeves reciprocably supporting a support shaft having on one end a friction increasing means extendable beyond the outer periphery of the tire assembly, the other end of said shaft being engageable by the annular force transmitting inflatable tube, said shafts having circumposed about an intermediate portion thereof a compression spring which engages the inner periphery of the wheel rim and a terminal abutment portion on the inner end of the support shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a sectional view taken substantially on line 3—3 of Figure 2;

Figure 4 is a fragmentary sectional view similar to Figure 2 showing the lug assemblies in an extended friction increasing position; and Figure 5 is an exploded perspective view of one of the lug assemblies of the novel anti-skid wheel assembly.

Figure 1:
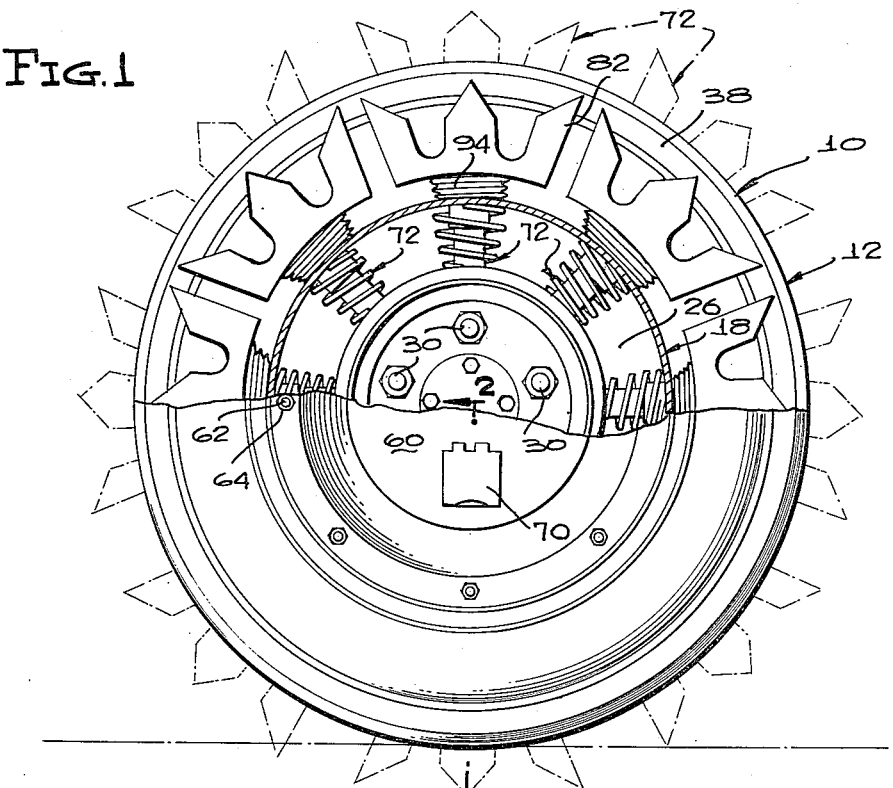
Figure 1 is a side elevational view of the novel anti-skid wheel assembly incorporating the principles of the invention, with portions broken away and shown in section for clarity, showing in phantom lines the manner in which the friction increasing means of the lug assemblies of a novel wheel may be extended beyond the outer periphery of the tire assembly of the wheel.
Figure 2:
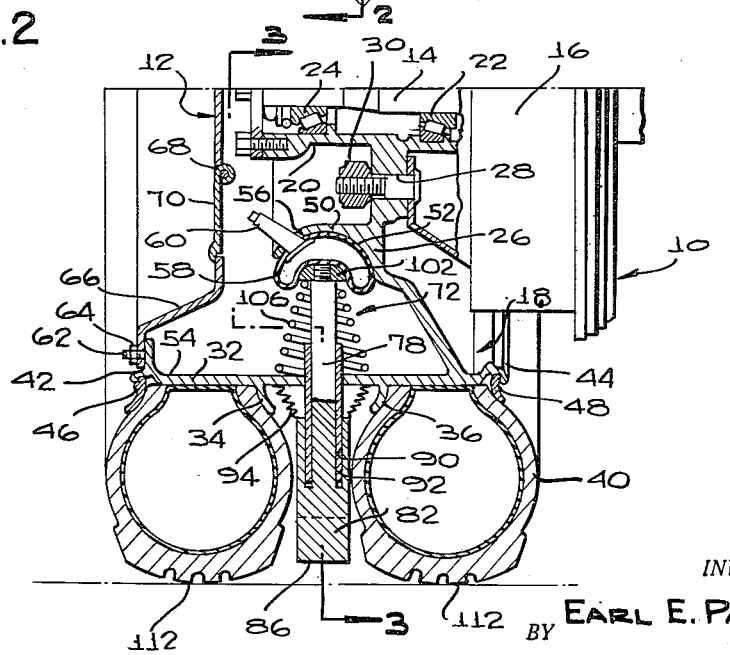
Figure 2 is an enlarged fragmentary sectional view taken substantially on line 2—2 of Figure 1.

Referring to the drawings in detail, the novel anti-skid wheel assembly is indicated generally at 10, and includes a wheel indicated generally at 12 which is mounted on the conventional wheel assembly axle 14 and brake drum housing 16 as shown fragmentarily in Figure 2.

Although the invention will be described in detail relative to a dual wheel assembly, it is to be considered within the purview of invention that the novel features or basic operating principles of the anti-skid wheel assembly to subsequently be described may be utilized on wheel assemblies incorporating a wheel rim which has mounted thereon a single tire assembly.

The novel wheel assembly 12 includes an annular wheel rim 18 incorporating a central transverse tubular mounting portion 20 the inner periphery of which engaging the bearing assemblies 22 and 24 which are circumposed about the wheel shaft or axle 14. The rim 18 may conveniently be of the "disc" type including a solid mounting flange portion 26 including a plurality of transverse concentrically disposed apertures 28 therethrough which accommodate the mounting lugs indicated at 30. The mounting flange 26 is formed integral with an annular wheel rim portion 32 which has extending in transverse spaced relationship about the inner periphery annular flanges 34 and 36 for engagement on one side of the outer tire bead portion of conventional tire assemblies 38 and 40, respectively. The rim portion 32 will also include at opposite edges annular grooved mounting portions 42 and 44 for accommodating therein split ring type retainers 46 and 48, respectively, for engaging the opposite side bead portion of the aforementioned tire assemblies. The structure just described is of a conventional nature as will be readily apparent to one skilled in the art.

The mounting flange 26 has formed integral therewith an annular support flange 50 including an annular concave surface portion 52, see Figure 2, which extends toward the inner periphery 54 of the rim portion 32, said support flange 50 being concentrically disposed relative to the inner periphery of said rim portion 32. Supported on the annular rim 50, which has a transverse aperture 56 extending therethrough, is an inflatable force transmitting means comprising relatively heavy grade annular tube 58 which has an inflating stem and valve assembly 60 extending through the aperture 56 of the support flange 50. As illustrated, the tube 58 will be inflated by means of pneumatic pressure, however, this means may be inflated by means of hydraulic pressure, for example, and although being illustrated as being inflatable at a service station, for example, the force transmitting means 58 comprising the pneumatic tube may be utilized with structure similar to a master cylinder of a vehicle brake system whereby the force transmitting means 58 may be inflated in a manner similar to which the brake cylinders of a wheel brake assembly are actuated.

The wheel rim portion 32 may include on the mounting portion 42 thereof, see Figure 2, a plurality of laterally extending circumferentially disposed mounting studs 62 which co-operate with suitable fastening nuts 64 for mounting on the wheel rim a cover plate 66, said cover plate having extending therethrough an aperture portion 68, said aperture 68 being located adjacent the inflating stem and valve assembly 60 of the inflatable tube 58, the aperture 68 being closed by means of a suitably mounted access door 70.

Indicated generally at 72 are a plurality of radially disposed extensible friction increasing lug assemblies which comprise radially extending tubular support sleeves 74 which extend through suitable circumferentially spaced apertures extending through the rim portion 32 of the wheel rim 18, being secured thereto by means of welds 76, for example, see Figure 4. The sleeves 74 are disclosed as being rectangular in cross section, however, any suitable cross sectional configuration may be utilized, the rectangular cross sectional configuration being convenient for preventing longitudinal rotation of an extendable shaft which will be reciprocably supported in the sleeve 74 as subsequently will be described. A support shaft 78 of a similar configuration to the sleeve 74 is reciprocably received in the sleeve 74, said shaft having formed on the outer or terminal end 80 thereof a transversely extending head member 82 which is formed in a plurality of friction increasing tapered ends 84, 86 and 88, see Figure 4, for example. The member 82 has integrally formed therein in surrounding relationship to the shaft 78 a recess portion 90 for receiving the upper end 92 of the support sleeve 74 therein, see Figure 2. The upper end 92 of the sleeve 74 will be received in said recess portion when the shaft is disposed in the retracted position shown in Figure 2. Conversely, as seen in Figure 5, when the shaft 78 is disposed in the extended position shown therein the end portion 92 of the sleeve 74 will be disposed out of the recess 90 of member 82. In order to prevent foreign matter from entering into the recess 92 a suitable collapsible boot element 94, see Figures 2 and 5, is suitably secured between the inner surface 96 of the friction increasing member 82 and an oppositely disposed outer peripheral portion of the rim portion 32.

The support shaft 78 has formed on the inner end 98 thereof a threaded stud portion 100 which receives thereon an abutment lug element 102 which includes an internally threaded transverse aperture portion 104, see Figure 4, and circumposed about an intermediate portion of the shaft 78 is a suitable compression spring member 106 which has one end 108 in engagement with the abutment element 102, the other end of which being in engagement with the inner periphery 54 of the rim portion 32, as indicated at 110. Thus the compression springs 106 urge the support shafts 78 and the friction increasing member 82 thereof toward a retracted position illustrated in Figure 2, the force transmitting means 58 being shown in a collapsed position, it further being noted that the abutment elements 102 are engaged with the tube 58. When the lug assemblies are disposed in the position shown in Figure 2, in this position the friction increasing or sharpened end portions 84 through 88 are disposed below the outer periphery 112 of the tire assemblies 38 and 40, it being understood if a suitable rim incorporating but a single tire assembly is utilized the same relationship will exist. When conditions occur such as excessive muddy ground, ice or snow conditions, etc. the tube 58 will be inflated as seen in Figure 5 whereafter the friction increasing lower end portions 84 through 88 will be extended beyond the outer periphery of the tire assemblies 38 and 40, the inflatable force transmitting or pressure means 58 being sufficient to overcome the compression springs 106 for this purpose. Further, as the vehicle incorporating the novel anti-skid wheel assemblies thereon proceeds over the ground the relationship of the compression springs 106 and the inflatable tube 58 will afford a resiliency or shock absorbing feature which afford a comfortable ride in the vehicle. It is believed readily apparent that the previously described invention fully conforms with the objects of invention heretofore set forth, and is readily adaptable to be manually actuated from the cab of a truck, tractor, passenger vehicle, etc.

Various positional directional terms such as "outer," "inner," etc. are utilized herein to have only relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. An anti-skid wheel assembly comprising a wheel including an annular wheel rim, a tire assembly mounted on said rim, support flange means on said wheel in spaced relation from the inner periphery of the annular wheel rim, a plurality of radially disposed lug assemblies reciprocably supported in circumferentially spaced aperture portions extending through the annular wheel rim, said lug assemblies including friction increasing end portions extendable beyond the outer periphery of the tire assembly, spring means engaged between the lug assemblies and the inner periphery of the annular wheel rim for urging the friction increasing means below the outer periphery of the tire assembly, and fluid pressure means carried on the support flange means in engagement with an adjacent end portion of the lug assemblies for overcoming the spring means and extending the lug assembly friction increasing portion beyond the outer periphery of the tire assembly.

2. An anti-skid wheel assembly comprising a wheel including an annular wheel rim, a tire assembly mounted on said rim, support flange means on said wheel in spaced relation from the inner periphery of the annular wheel rim, a plurality of radially disposed lug assemblies reciprocably supported in circumferentially spaced aperture portions extending through the annular wheel rim, said lug assemblies including friction increasing end portions extendable beyond the outer periphery of the tire assembly, spring means engaged between the lug assemblies and the inner periphery of the annular wheel rim for urging the friction increasing means below the outer periphery of the tire assembly, and fluid pressure means carried on the support flange means in engagement with an adjacent end portion of the lug assemblies for overcoming the spring means and extending the lug assembly friction increasing portion beyond the outer periphery of the tire assembly, said support flange means comprising an annular flange member disposed in concentrically spaced relationship from the inner periphery of the annular wheel rim, said fluid pressure means comprising an inflatable annular tube circumposed about the annular flange member, the outer periphery of said inflatable tube being in engagement with an adjacent portion of the lug assemblies.

3. An anti-skid wheel assembly comprising a wheel including an annular wheel rim, a tire assembly mounted on said rim, support flange means on said wheel in spaced relation from the inner periphery of the annular wheel rim, a plurality of radially disposed lug assemblies reciprocably supported in circumferentially spaced aperture portions extending through the annular wheel rim, said lug assemblies including friction increasing end portions extendable beyond the outer periphery of the tire assembly, spring means engaged between the lug assemblies and the inner periphery of the annular wheel rim for urging the friction increasing means below the outer periphery of the tire assembly, and fluid pressure means carried on the support flange means in engagement with an adjacent end portion of the lug assemblies for overcoming the spring means and extending the lug assembly friction increasing portion beyond the outer periphery of the tire assembly, said lug assemblies including tubular guide sleeves secured in radially disposed relationship in the aperture portions of the annular wheel rim, support shaft elements extending through the sleeve members, outer end portions of the shaft elements including thereon friction increasing means engageable with a support surface over which the wheel assembly travels, inner end portions of the support shaft elements including an enlarged abutment portion, the spring means comprising compression springs circumposed about an intermediate portion of the support shaft elements, one end of the compression spring engaging the inner periphery of the annular wheel rim, the other end of said spring engaging the abutment portion of the support shaft elements.

4. An anti-skid wheel assembly comprising a wheel including an annular wheel rim, a tire assembly mounted on said rim, support flange means on said wheel in spaced relation from the inner periphery of the annular wheel rim, a plurality of radially disposed lug assemblies reciprocably supported in circumferentially spaced aperture portions extending through the annular wheel rim, said lug assemblies including friction increasing end portions extendable beyond the outer periphery of the tire assembly, spring means engaged between the lug assemblies and the inner periphery of the annular wheel rim for urging the friction increasing means below the outer periphery of the tire assembly, and fluid pressure means carried on the support flange means in engagement with an adjacent end portion of the lug assemblies for overcoming the spring means and extending the lug assembly friction increasing portion beyond the outer periphery of the tire assembly, said lug assemblies including tubular guide sleeves secured in radially disposed relationship in the aperture portions of the annular wheel rim, support shaft elements extending through the sleeve members, outer end portions of the shaft elements including thereon friction increasing means engageable with a support surface over which the wheel assembly travels, inner end portions of the support shaft elements including an enlarged abutment portion, the spring means comprising springs circumposed about an intermediate portion of the support shaft elements, one end of the compression spring engaging the inner periphery of the annular wheel rim, the other end of said spring engaging the abutment portion of the support shaft elements, said support flange means comprising an annular flange member disposed in concentrically spaced relationship from the inner periphery of the annular wheel rim, said fluid pressure means comprising an inflatable annular tube circumposed about the annular flange member, the outer periphery of said inflatable tube being in engagement with an adjacent portion of the lug assemblies.

References Cited in the file of this patent

UNITED STATES PATENTS

| | | |
|---|---|---|
| 985,112 | Conrad | Feb. 21, 1911 |
| 1,132,905 | Beres | Mar. 23, 1915 |
| 2,201,632 | Roessel | May 21, 1940 |
| 2,254,318 | Roessel | Sept. 2, 1941 |